Oct. 23, 1928.
S. W. MILLER
1,688,980
MULTIPLATE VERTICAL WALL
Filed June 6, 1925
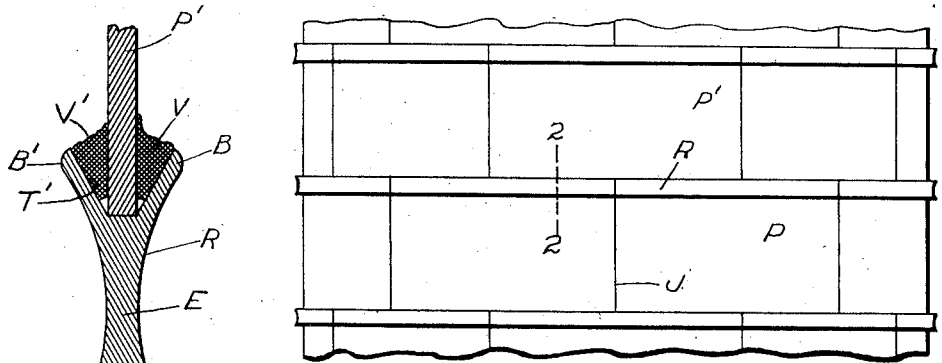
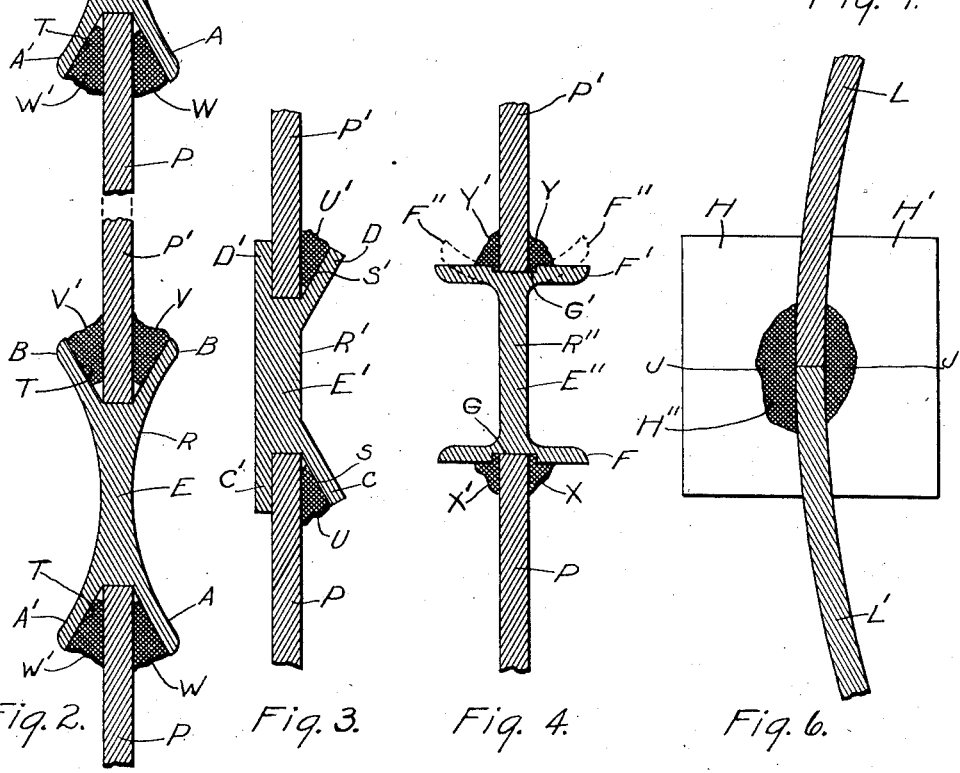
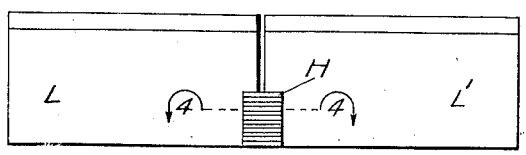
Samuel W. Miller
INVENTOR.
BY *Cyrus Townsend Brickwater*
ATTORNEYS.

Patented Oct. 23, 1928.

1,688,980

UNITED STATES PATENT OFFICE.

SAMUEL W. MILLER, OF HOLLIS, NEW YORK, ASSIGNOR TO LINDE AIR PRODUCTS COMPANY, A CORPORATION OF OHIO.

MULTIPLATE VERTICAL WALL.

Application filed June 6, 1925. Serial No. 35,483.

This invention relates to the fabrication of steel tanks such as gas and oil storage tanks, and particularly to the welding of the vertical and the circumferential seams between the side plates of such tanks. The invention has for its principal objects to eliminate distortion of the plates caused by the welding heat, to increase the strength and uniformity of the welded joints, and to save labor and welding gas or current.

In joining steel plates and shapes by welding, steels and ferrous alloys have heretofore been fused by a high-temperature heat source, such as an oxy-acetylene flame or an electric arc, and applied to the contiguous edges or seam between the plates. In order that a satisfactory weld union shall be obtained, this practice requires the fusion of the plates or base metal along the seam, which involves raising the plates to a very high temperature at the portions to be weld united as well as some distance back from such portions. As the weld and adjoining metal cool off, there is considerable distortion of the plates.

However, welding with so-called steel welding rod, which includes those consisting of ferrous alloys, has the advantage that the rapid solidification of the weld metal makes it quite easy to weld in any position. Moreover, weld metal having the characteristics of steel adheres to a seam on one side of the plates while such weld metal is similarly applied to the same seam at the opposite side, although this necessitates twice heating the plates to the high temperature required for welding with such metal and twice subjects the plates to conditions tending to produce distortion.

By heating the plates to a lower temperature, it is evident that the distortion effects of so-called steel welding may be greatly reduced or practically eliminated. Welding at a lower temperature may be accomplished by using a non-ferrous weld metal having a lower melting point and greater plasticity than steel, such non-ferrous weld metal being fused into place by the application of a high-temperature source of heat but without raising the base metal to a fusion temperature, in accordance with the welding process disclosed in Patent No. 1,620,324, issued March 8, 1927, in the name of Glenn O. Carter. But when such non-ferrous metals, generally known as bronzes, are used as added weld metal, the liquidity thereof during application makes welding in any position other than substantially flat, a rather difficult matter, consequently the welding speed is reduced, and the quality of the weld is likely not to be as good as in flat welding.

Accordingly, I have devised means whereby welds with non-ferrous weld metal may be made even though the contiguous edges or weld seams be vertical or horizontal seams of a vertical wall consisting of a multiplicity of plates. To this end, I provide means for retaining or damming the liquid weld metal along the seams between plates, to hold it in place until it solidifies, such retaining means being permanently incorporated in the structure in some instances and only temporarily used in others. Furthermore, by simultaneously welding each seam at opposite sides of the plates, where that is desirable, this so-called bronze or brass welding process is more readily applicable to the welding of vertical and horizontal seams of vertical walls, besides reducing distortion of the plates as well as labor and welding gas or current.

The objects and novel features of this invention will be apparent from the following description taken with the accompanying drawings, in which:

Fig. 1 is an elevation of a partly completed tank side made according to this invention;

Fig. 2 is an enlarged fragmentary vertical section along the line 2—2 of Fig. 1;

Figs. 3 and 4 are vertical sectional views of other types of horizontal welds embodying this invention;

Fig. 5 is a view illustrating the procedure of welding vertical seams; and

Fig. 6 is a section along the line 4—4 of Fig. 5, illustrating a horizontal section of a vertical weld.

Referring to Fig. 1 of the drawings, the vertical side wall of a tank, welded in accordance with the principles of this invention, may consist of a multiplicity of curved rectangular rolled steel plates, say of about ¼" gage, arranged in circumferentially-extending horizontal rows vertically in line. The edges of the plates are desirably square sheared and their horizontal edges are united by suitable weld metal retainers R, which are disposed between and welded to opposed plate edges.

For the purposes of this invention, the retaining means or plate connectors R may take various forms, being primarily constructed to retain the weld metal at the plate edges, and furthermore designed so that weld metal deposited at one plate edge will not be melted or loosened when welding heat is applied to an adjoining edge. As shown in Fig. 2, the improved connector R consists of an elongated rigid metal member, desirably a rolled shape of about the same length, curvature, and gage as the side plates with which it is to be used. The longitudinal edges of the connector are split or otherwise formed to provide walls A, A' and B, B', which walls are severally spread apart to provide troughs or channels T and T' extending the entire length of each longitudinal edge of the connector to receive the edges of plates P, P' and the weld metal for securing together such plates and the interposed connector. The bottoms of these channels are desirably flat to fit the abutting edge of a plate, and the walls A, A' and B, B' may be inclined more or less depending upon the quantity of weld metal required in the spaces between such walls and the inserted plate edge to properly unite these parts.

The side wall is desirably built up of units, each unit comprising a side plate having a connector R welded thereto. A plate P, for example, is positioned with its lower edge resting on the bottom of the channel T in upright position whereupon suitable weld metal, such as so-called bronze, is fused into the channel at opposite sides of the plate therein as at W and W', the channel walls A, A' retaining the liquid weld metal in place and serving as gages to indicate when a sufficient amount of weld metal has been applied. Thereupon, this unit is inverted and the opposite edge of the plate P, if the unit is in the lowest row, may be welded to the bottom of the tank or to a curb ring at the periphery of the tank bottom, in the manner set forth in an application Serial No. 35,383, filed June 6, 1925, in the name of Glenn O. Carter, Robert B. Aitchison and Matthew J. Wall. In this position the connector on the plate P is inverted, with the channel T' in upright position to receive the lower edge of a plate P' of a unit in the next higher row, this unit being substantially similar to the unit already described and carrying a connector at its opposite or upper edge. Weld metal is then fused into the channel T' at opposite sides of the plate P', as at V, V'; the walls B, B' retaining the liquid weld metal in place and serving as gages. This procedure is repeated circumferentially and vertically until the plates making up the wall are all in place. As each horizontal row is built its vertical seams may be welded in a manner to be described. The width of the connector web E is such as to prevent the transfer of sufficient heat from the welding operation in the channel T' to the channel T to fuse the weld metal in the latter or otherwise loosen the union along the same. The tank wall as completed consists of alternate horizontal rows of steel plates and steel connectors welded together, such connectors forming reinforcing bands around the tank.

While the connector shown in Fig. 2 has particular advantages, the shape thereof may be varied without departing from the principles of the invention. In Fig. 3, for example, a connector R' is illustrated that is particularly adapted for structures in which the weld metal is only applied to one side of the plate edge. Since the stress in circumferential seams is generally low, welding only on one side with this type of connector will be adequate in most cases and will save considerable welding. Channels S, S' are provided in opposite longitudinal edges of this connector to receive the plate edges, as before; but only one of each pair of channel side walls is inclined or bent outwardly to provide space for the weld metal. As shown, the channel walls C and D are spread from the walls C' and D', the inside surfaces of the latter being thus disposed so as to abut against the faces of the plates adjacent the longitudinal edges which bear against the bottoms of the channels. The same procedure of assembling and welding the plates P, P' and resulting units is followed with this form of connector as has been explained respecting the use of the connector R. The connector R' is first supported with its channel S upright, then the edge of the plate P is inserted in this channel with a portion of its face bearing against the inner surface of wall C'. Weld metal U is then fused in the space between the other side of the plate and the wall C. After the weld metal has cooled sufficiently, the unit is inverted to weld the other longitudinal edge of the plate P to the tank bottom or next lower connector. The channel S' is then in upright position to receive the lower edge of a plate P', which may be welded in place as already explained. The weld metal U', no matter how liquid, will be retained in the channel S', and the weld metal U will be protected against fusion by the intervening web E'.

In many instances it is not essential to use a special rolled section as a connector. As illustrated in Fig. 4, an ordinary I beam may be employed as the connector R'', the same being desirably provided with grooves G, G' in its opposite sides in line with the web E'' to serve as channels for receiving the edges of the plates P, P' to restrain them from too free movement and assist in bringing such plates to the proper circular shape, the connectors R' and R'' being curved or otherwise shaped to conform to the contour of the tank in which they are used. The assembling and welding procedure already explained may be followed, by first applying the weld metal X, X' between the opposite surfaces of the plate P and the surfaces of the groove G and outer surface of the flange F; then inverting the unit and setting the plate P in the groove G' and similarly welding with weld metal Y, Y' to the adjoining surfaces of the groove G' and flange F'. In order to better retain the weld metal, either or both flanges F, F' may be bent outwardly as indicated at F''.

Welding of the vertical seams presents further difficulties, especially when low melting non-ferrous alloys are used as weld metal, because they are so fluid that they flow away from the seam before they have time to cool and solidify. This difficulty with such alloys is further aggravated when opposite sides of a seam are successively welded, since welding at the second side fuses the metal from the first side welded. To overcome such difficulties, the welding at opposite sides of a vertical plate seam may be carried forward simultaneously by two or more welders, and suitable retaining means or dams may be built up step by step along opposite sides of the seam just in advance of the welding to retain the weld metal in place until it solidifies, after which the retaining means may be removed. As illustrated in Figs. 5 and 6, the edges of two adjoining plates L, L' may be cut off square or otherwise and set in abutting or overlapping relation to provide a seam. As weld metal is applied vertically along the inside and outside of this seam simultaneously, metal retaining devices or dams are built up as the welding proceeds. These dams may consist of small carbon blocks H, H', about ½" thick, having recesses H'' in one side arranged in alinement adjacent the seam to form a retaining channel for the weld metal J, J' that is deposited therein and onto the seam. Suitable clamps and other devices may of course be applied to hold the assembly in position during the welding operation. This method of welding vertical seams may also be applied to the welding of horizontal seams. Likewise the method of welding horizontal seams may also be utilized in welding vertical seams.

Since the vertical seams of a tank are required to withstand considerable strains, welding the opposite sides of tank plate seams is a feature of considerable importance. In accordance with the procedure described, the opposite sides of the plate seams may be heated from two sources at the same time, thereby quickly raising them to a welding temperature. There is no danger of damaging a completed weld by subsequent welding, and no need of raising the plates to a welding temperature more than once, nor more than once subjecting the plates to the distorting influence of welding heat. The lower temperature that may be employed to fuse the non-ferrous weld metal and unite it to the ferrous base metal of the plates and the decreased danger of injuring the metal by overheating are decided advantages of this procedure. Overhead and difficult welding are also avoided.

While the invention is shown and described as applied to the welding of steel plates and shapes, certain features thereof are adapted to be employed in welding other structures comprising members of ferrous materials. Although the welding procedure herein outlined is independent of the type of welding equipment used, whether gas or electric, it nevertheless has special applicability and advantages in welding by means of gases, as with the oxy-acetylene blowpipe. Furthermore, according to the present invention, the weld metal that is applied to ferrous base metal by a high-temperature heat source may consist of steels, alloy steels and non-ferrous alloys having a lower melting point and greater plasticity than steels and ferrous alloys. However, the improvements herein described are particularly adapted for welding with such non-ferrous alloy weld metal or so-called bronzes, the compositions of three examples being as follows: Composition No. 1 may consist of copper, 59.00–62.00%; tin, 0.50–1.00%; lead, not over 0.10%; iron, not over 0.20%; zinc, remainder. Composition No. 2 may consist of copper, 56.00–59.00%; tin, 0.75–1.10%; lead, not over 0.10%; iron, 0.75–1.25%; manganese, not less than 0.02%; zinc, remainder. Composition No. 3 may consist of copper, 63.0–66.0%; zinc, 34.0–37.0%; lead, not over 0.10%.

I claim:

1. A method of constructing a vertical multi-plate metal wall that comprises severally welding lower edges of such plates to connectors, assembling such plate-connector units in said wall in inverted position so that the connector of each unit extends along the upper edge of each unit, and then welding the lower edge of the plate of each unit to the connector of an adjacent lower unit in the wall.

2. A method of constructing a vertical multi-plate metal wall that comprises alining plates vertically, interposing connectors between such plates having relatively narrow channels receiving opposed edges of said plates to be united, and depositing fused weld metal of substantially lower melting point than steel into such channels whereby the fluid weld metal is retained close to the plate edges in the channels and such channels gage the quantity of weld metal deposited.

3. A vertical multi-plate metal wall comprising vertically alined metal plates, connectors interposed between and extending lengthwise of the horizontal edges of said plates, said connectors having relatively narrow edge channels receiving horizontal edges of said plates, and weld metal filling said channels and uniting said plates and said connectors.

4. A connector for use in uniting metal members by welding, said connector having a web and laterally projecting flanges coextensive with the longitudinal edges of said web constructed to retain and gage weld metal deposited along the edges of members to which said connector is welded.

5. A connector for use in weld uniting metal plates, said connector comprising a web having a medial thickness substantially the same as said plates and also having laterally projecting flanges co-extensive with and forming channels lengthwise of both edges of said web to receive edges of such plates and retain and gage fluid weld metal deposited in said channels to unite the plate edges to such connector.

6. A method of uniting vertically disposed metal members that comprises simultaneously depositing fused weld metal along both sides of a seam between such members, and damming such weld metal in place on both sides of said seam while it is fluid to prevent its escape.

In testimony whereof, I affix my signature.

SAMUEL W. MILLER.